US006795135B1

(12) United States Patent
Moon

(10) Patent No.: US 6,795,135 B1
(45) Date of Patent: Sep. 21, 2004

(54) REFLECTIVE LIQUID CRYSTAL DISPLAY DEVICE WITH REMOVABLE AUXILIARY LIGHT SOURCE

(75) Inventor: Jeonggmin Moon, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/568,684

(22) Filed: May 11, 2000

(30) Foreign Application Priority Data

May 11, 1999 (KR) .......................................... 1999-16742

(51) Int. Cl.[7] ...................... G02F 1/1335; G02F 1/1333
(52) U.S. Cl. ............................................. 349/61; 65/56
(58) Field of Search .............................. 349/56, 61, 65, 349/57, 58, 60, 63, 113, 114, 68

(56) References Cited

U.S. PATENT DOCUMENTS 4,809,078 A * 2/1989 Yabe et al. .................. 348/794
6,034,750 A * 3/2000 Rai et al. ...................... 349/57
6,046,785 A * 4/2000 Won ............................. 349/58
6,373,537 B2 * 4/2002 Yun et al. ..................... 349/58

FOREIGN PATENT DOCUMENTS

| JP | 09166766 | * 6/1997 | ............ G02F/1/13 |
| JP | 10246886 | 9/1998 | |
| JP | 2001-091946 | * 4/2001 | |

* cited by examiner

Primary Examiner—Dung T. Nguyen
Assistant Examiner—Jeanne Andrea Di Grazio
(74) Attorney, Agent, or Firm—Birch, Stewart, Kolasch & Birch, LLP

(57) ABSTRACT

A reflective liquid crystal display device including a liquid crystal display and a body case for protecting the display. An auxiliary light source device supplies light to the display. At least one of the body case and the auxiliary light source device includes engaging structure for removably engaging the auxiliary light source device with the body case. Both of the body case and the auxiliary light source device include electric connection structure for electrically connected the body case and the auxiliary light source device.

29 Claims, 7 Drawing Sheets

REFLECTIVE LIQUID CRYSTAL DISPLAY DEVICE WITH REMOVABLE AUXILIARY LIGHT SOURCE

CROSS REFERENCE

This application claims the benefit of Korean Patent Application No. 1999-16742, filed on May 11, 1999, under 35 U.S.C. § 119, the entirety of which is hereby incorporated by reference.

BACKGROUND OF THE INVENTION

1. Field of the Invention

This invention relates to a reflective liquid crystal display device, and more particularly to a reflective liquid crystal display device having an auxiliary light source.

2. Description of Related Art

In general, liquid crystal display devices are divided into transmissive liquid crystal display devices and reflective liquid crystal display devices depending on whether an internal or an external light source is used.

While the transmissive liquid crystal display device uses an internal light source such as a backlight, the reflective liquid crystal display device uses ambient light and thus is affected by the surroundings. For example, the brightness of ambient light in an office differs largely from that in the outdoors. Also, even in the same location, the brightness of outer light depends on the time of day (e.g., noon or dusk). Hence, it is desirable for an auxiliary light source to be mounted on the reflective liquid crystal display device to remove such dependence on the ambient light.

FIG. 1 is a cross-sectional view illustrating, schematically, the principle of an auxiliary light source of a prior art reflective liquid crystal display device. The auxiliary light source mounted on the display device body 4 has a lamp 1, a lamp reflector 2, and a waveguide plate 3. The display device body 4 includes a reflector (not shown), for reflecting incident light from the light source or a natural light.

A reflective LCD device as described generally utilizes the natural light as a light source, but the auxiliary light source is operated when it is dark or in dark surroundings. First, light is emitted from the lamp 1 and the emitted light is directed in a direction via the lamp reflector 2. Then, the collected light is reflected upwards and downwards while passing through the light waveguide plate 3, due to the structure of the waveguide plate 3. Thus, only the light incident within a determined range of angles with the vertical direction is transmitted upward, and the remainder light is reflected downward.

Downward light is incident to the body 4 of the reflective liquid crystal display device and is reflected by the reflective electrode or reflector (not illustrated) in the body 4. The reflected light passes through the light waveguide plate 3 and then is viewed as information by the user.

An example of the above described display with an auxiliary light source is a personal portable terminal (model name: Zaurus MI-310) of Sharp Kabushiki Kaisha, in which the auxiliary light source is fixed.

As described above, the conventional reflective liquid crystal display device utilizes an auxiliary light source for light supply when it is dark, thereby improving the display characteristics of the reflective LCD device. However, even when the auxiliary device is not used, the ambient light or natural light must still pass through the auxiliary device, and thus the contrast ratio of the LCD device is decreased by the reflected light on the surface of the auxiliary light source. Also, the auxiliary device is inconvenient to carry due to its size and weight. Moreover, some users may not want such an auxiliary light source. Therefore, there has been an increasing need for a detachable auxiliary light source that may be substituted for the conventional auxiliary light source.

SUMMARY OF THE INVENTION

An object of this invention is to provide a reflective liquid crystal display device with an auxiliary light source that is capable of being detached according to the preference of the user.

In order to achieve the object, one embodiment of the invention provides a reflective liquid crystal display device having a body case containing a reflective liquid crystal display; and an auxiliary light source for supplying light to the display, the auxiliary light source being attachable to and removable from the body case by a user of the device.

Another embodiment of the invention provides a reflective liquid crystal display device having a reflective liquid crystal display; and a body case to protect the display, including engaging structure to selectively engage an auxiliary light source with the body case, and electric connection structure to electrically connect the body case and the auxiliary light source.

Another embodiment of the invention provides a removable auxiliary light source for use with a reflective liquid crystal display device, including: an auxiliary light source for supplying light to the display device, including engaging structure to selectively engage the auxiliary light source with a body of the display device, and electric connection structure to electrically connect the body and the auxiliary light source.

BRIEF DESCRIPTION OF THE DRAWINGS

For a more complete understanding of the invention and advantages thereof, reference is now made to the following description taken in conjunction with the accompanying drawings in which like numerals denote like parts and in which.

DETAILED DESCRIPTION OF PREFERRED EMBODIMENTS

A reflective liquid crystal display device according to this invention includes the internal components of a liquid crystal display, a body case to hold and protect the internal components, and an auxiliary light source device detachable from the body. The auxiliary light source device includes structure to mount the light source on the body and another structure to electrically connect the light source with the body.

Figure 1:
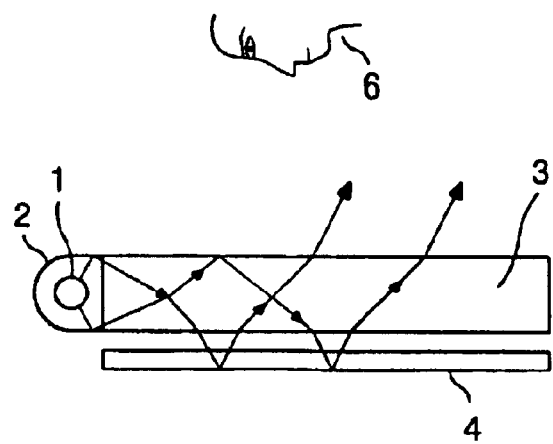
FIG. 1 is a cross-sectional view illustrating the auxiliary light source of a prior art reflective display device.
Figure 2:
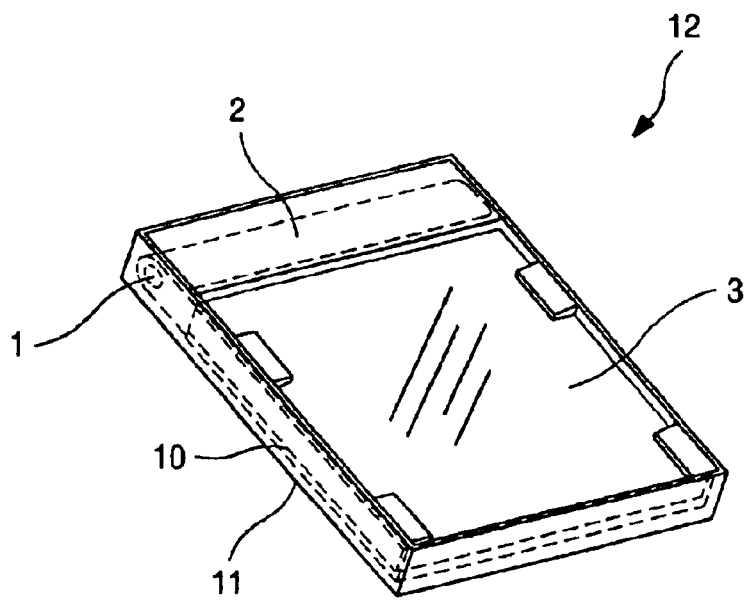
FIG. 2 is a perspective view illustrating the auxiliary light source of a reflective liquid crystal display device according to a first embodiment of the invention.

Now, the structure of a basic auxiliary light source device 12 according to a first embodiment of the invention will be described referring to FIG. 2. In FIG. 2, a light source or a lamp 1 and a lamp reflector 2, which surrounds the source 1 and redirects the light in a common direction, are shown. The light source 1 may include an inverter or may be, for example, a cold cathode fluorescent lamp, a white lamp array or white light emitting diode. That is, the source 1 may be any light source that can emit light, and the specific structure of the auxiliary light source device 12 may be modified according to any change in the source 1.

A light waveguide plate 3, that guides the majority of light emitted from the light source 1 in both upper and lower directions, is engaged with one side of the lamp reflector 2.

An outer frame 11 is provided to protect and fix the components of the auxiliary light source device 12. In addition, so that the light from the source 1 does not scatter out the light waveguide plate 3, a vertical reflector 10 is located along the vertical three sides of the light guide 3 other than the side adjacent to the lamp reflector 2. Alternatively, the inner side of the outer frame 11, appropriately coated, can substitute for the vertical reflector 10.

Such an auxiliary light source device 12 can be installed in a variety of ways on the main body of a reflective liquid crystal display device. Some of the various ways to combine the body and the auxiliary light source device will be described hereinafter.

Figure 3:
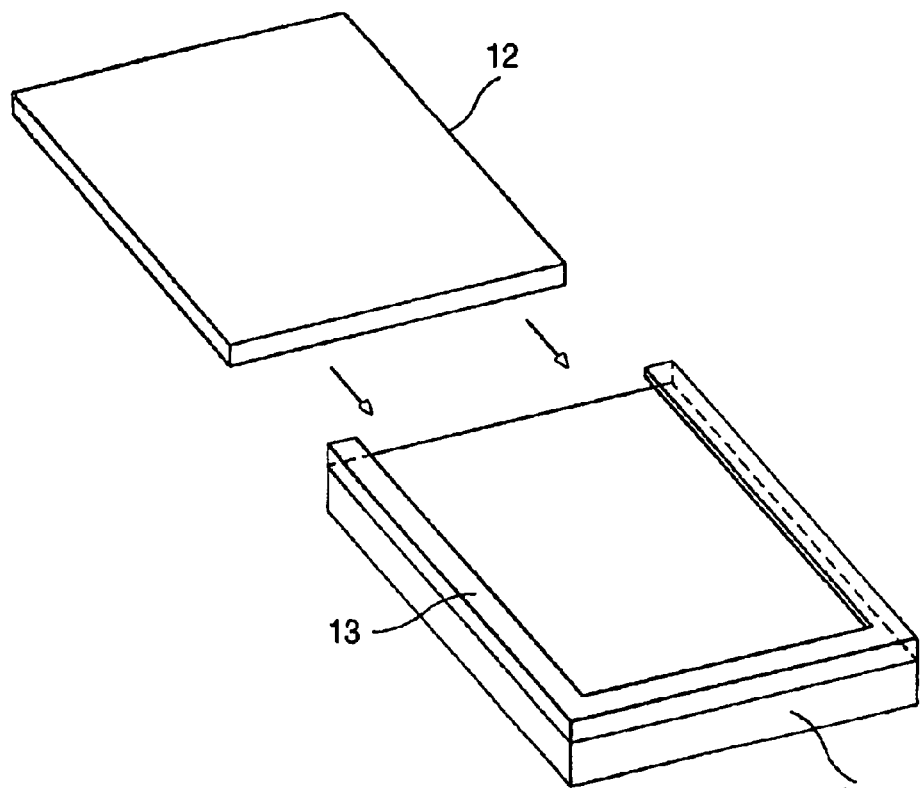
FIG. 3 is an exploded perspective view illustrating the auxiliary device and the body of a reflective liquid crystal display device according to the first embodiment of the invention.

In a first embodiment of the present invention shown in FIG. 3, the auxiliary light source device 12 is engaged by drawing or sliding into the body. FIG. 3 is a perspective view illustrating the main body of the reflective LCD according to the first embodiment of the invention, showing an engaging guide rail 13 provided in the upper side of the body 15a to contain the auxiliary light source device 12. The guide rail 13 is located on the three sides of the body 15a, with the ends of the rail inwardly bent parallel to the body 15a, so that the auxiliary light source device may be slid to fit in it. The auxiliary light source device 12 is simply put on the same horizontal plane with the body 15a and horizontally translated inward to combine with the body.

Figure 4A:
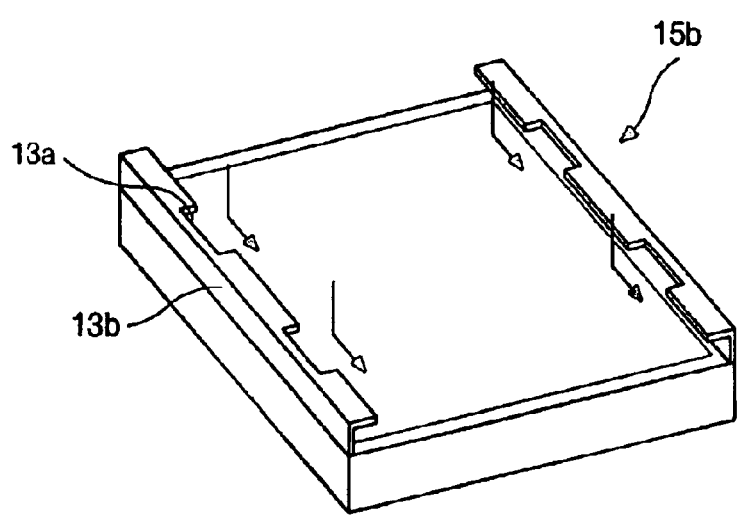
FIG. 4a is a perspective view illustrating the body of a reflective liquid crystal display device according to a second embodiment of the invention.
Figure 4B:
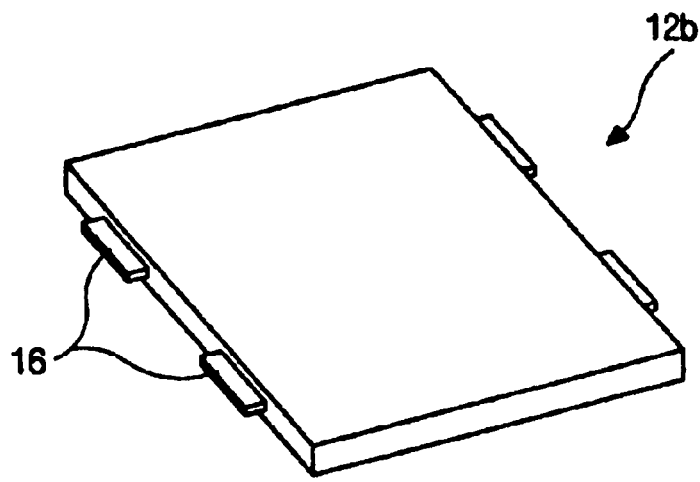
FIG. 4b is a perspective view illustrating the auxiliary light source device according to the second embodiment of the invention.

In a second embodiment of the invention shown in FIGS. 4a and 4b, another auxiliary light source device 12b includes convexities 16 (e.g., tabs), and another body 15b includes a concave shaped guide to combine with the tabs. FIG. 4a is a perspective view illustrating the body 15b according to the second embodiment of the invention. As shown, the body 15b is provided with a slotted engaging structure 13b. The auxiliary light source device 12b, shown in FIG. 4b, may be translationally combined with the body after being inserted from above. The engaging structure 13b is provided by the inwardly bent portions of the guide facing each other. This structure 13b also has a plurality of concavities (e.g., slots) 13a which accommodate the insertion of the tabs 16. The number of the concavities 13a may be varied from that shown in FIG. 4a.

As is illustrated in FIG. 4b, the lateral sides of the auxiliary light source device 12b also have a plurality of convexities 16 (e.g., tabs) in order to be combined with the upper concavities of the body 15b shown in FIG. 4a. After the body 15b and the auxiliary light source device 12b are placed matching the concavities to the convexities, the auxiliary light source device 12b is pushed vertically downward to insert its tabs. The auxiliary light source device is then translated horizontally and combined with the body, so that the tabs 16 are under the overhanging portions of the engaging structure 13b.

Figure 5A:
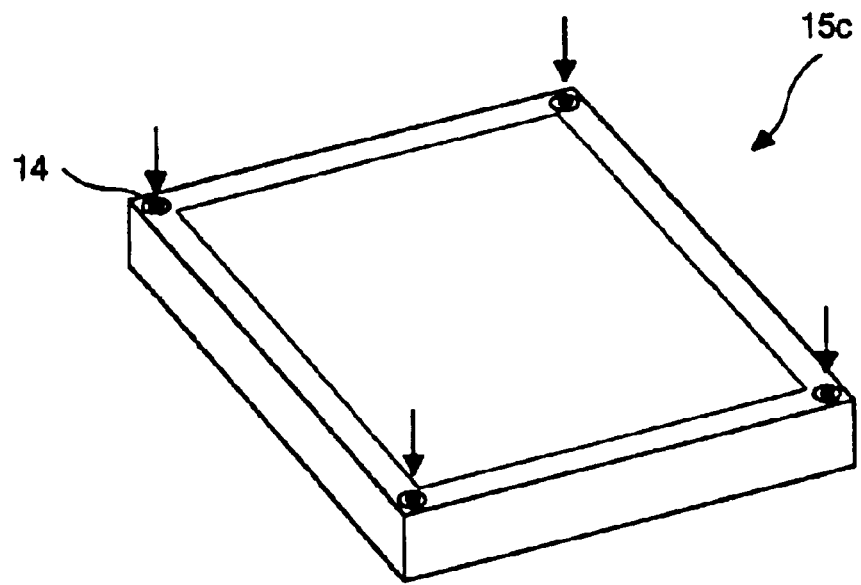
FIG. 5a is a perspective view illustrating the body of a reflective liquid crystal display device according to a third embodiment of the invention.
Figure 5B:
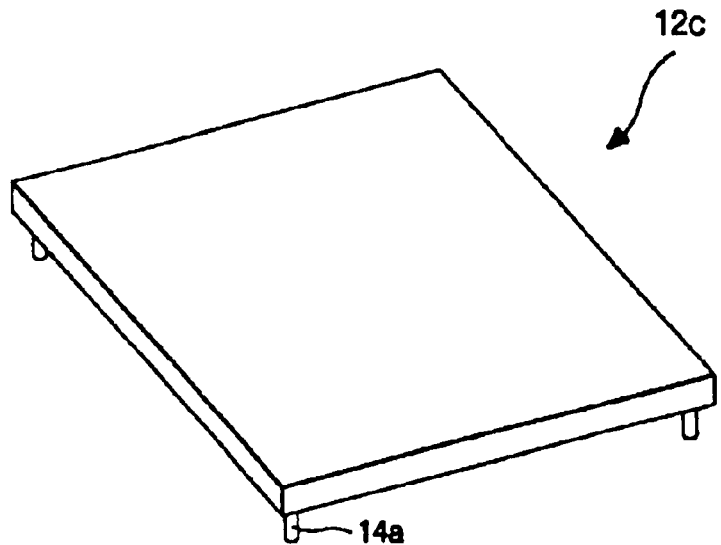
FIG. 5b is a perspective view illustrating the auxiliary light source device according to the third embodiment of the invention.

In a third embodiment according the invention shown in FIGS. 5a–5d, another auxiliary light source device 12c having projections is combined with a body 15c including holes to receive the projections. FIG. 5a illustrates the body 15c according to this embodiment, having four holes 14 at the upper corners, and FIG. 15b illustrates the auxiliary light source device 12c having four projections 14a at its corners.

Figure 5C:
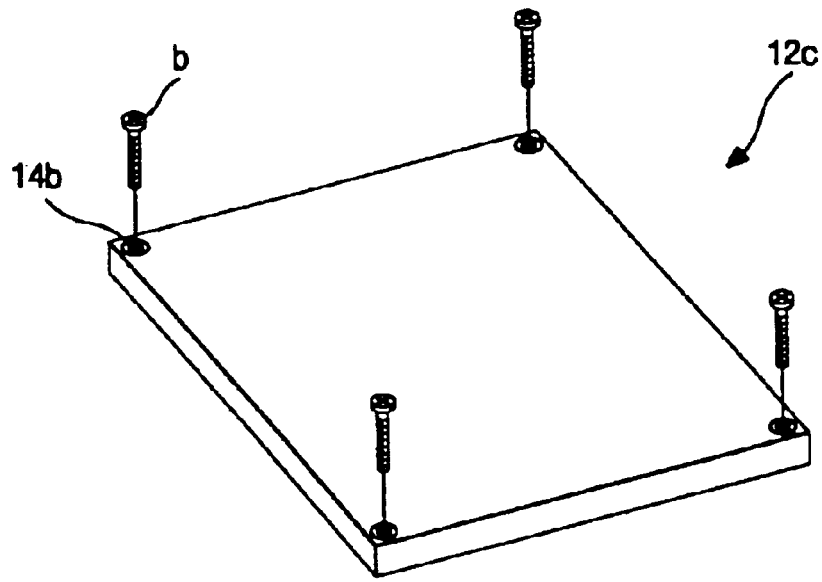
FIG. 5c is a perspective view illustrating a modified example of the auxiliary light source device according to the third embodiment of the invention.
Figure 5D:
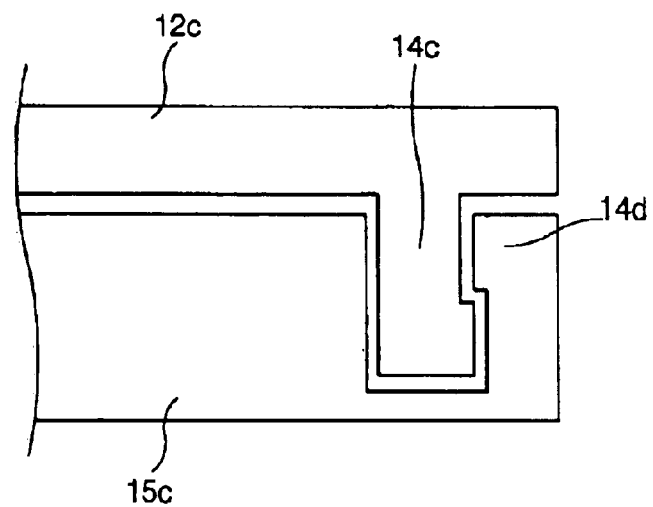
FIG. 5d is a cross-sectional view illustrating another example of the auxiliary light source device operatably coupled with the body according to the third embodiment of the invention.

Each of the projections 14a is formed at a position corresponding to each of the holes 14, and the projections 14a are pushed into the holes 14. In an alternate implementation of the third embodiment, as shown in FIG. 5c, the auxiliary light source device 12c may have corresponding screw holes 14b and the holes of the body 15c are also screw holes. In such a case the auxiliary light source device 12c is combined with the body 15c by screws b. Alternately, as shown in FIG. 5d, the auxiliary light source device 12c are engaged with the body 15c by a fastening hook having a first fastening means 14c and a second fastening means 14d.

The foregoing embodiments do not restrict the invention because they are only a few examples to illustrate the invention, the spirit of which is a detachable auxiliary source for a reflective liquid crystal display device. Thus, any other manner of engaging may be adopted for the user's convenience if it can be used to removably engage the auxiliary source of the invention.

Because the auxiliary light source device employs electricity, it should be supplied with electricity when engaged with the body, and accordingly it is provided with a connector for this purpose. The connector also may have various forms according to the above embodiments.

Figure 6:
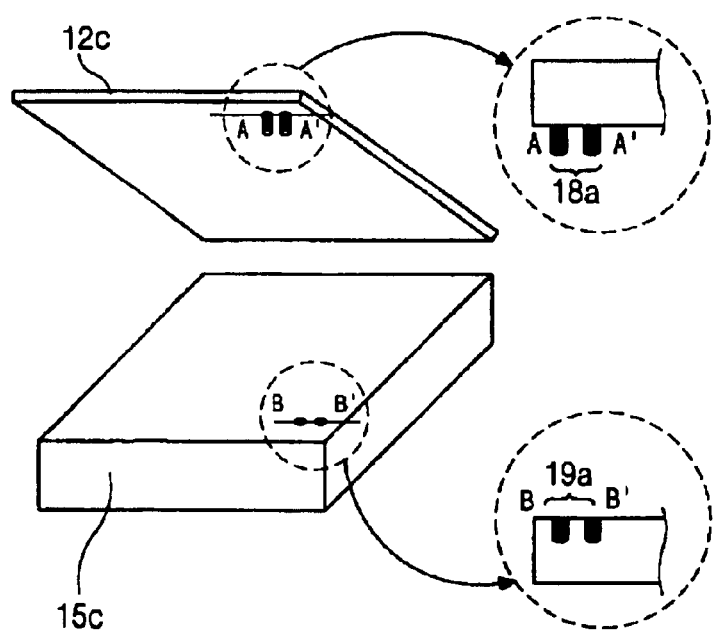
FIG. 6 is an exploded perspective view illustrating a first arrangement whereby the auxiliary light source device is electrically connected with the body according to the third embodiment.
Figure 7:
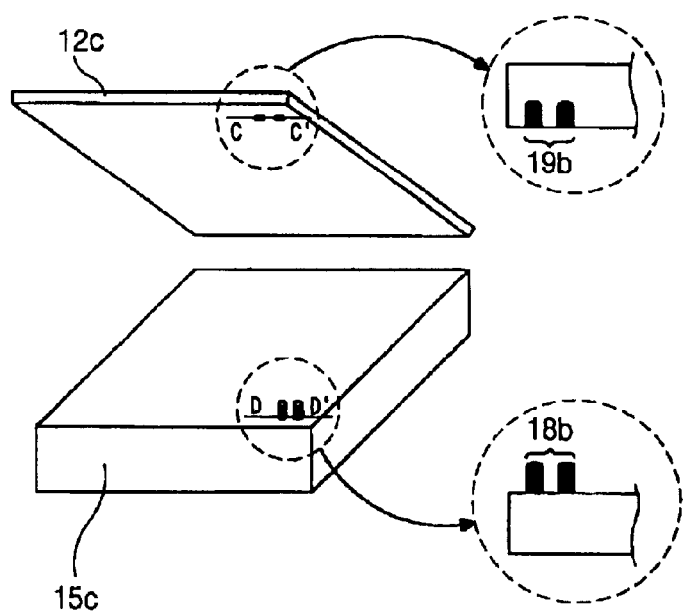
FIG. 7 is an exploded perspective view illustrating a second arrangement whereby the auxiliary light source device is electrically connected according to the third embodiment.

FIG. 6 illustrates a first arrangement whereby the auxiliary light source device according to the third embodiment is electrically connected with the body, and FIG. 7 illustrates the second method whereby the auxiliary light source device according to the third embodiment is electrically connected with the body.

In the third embodiment, as illustrated in FIG. 6, the auxiliary light source device 12c is provided with a male connector 18a in a suitable position and the body 15c is provided with a female connector 19a in a position corresponding to the male connector 18a. The male and female connectors are connected with each other to supply electricity from the body 15c to the auxiliary light source device 12c.

Alternatively, as illustrated in FIG. 7, the auxiliary light source device 12c may be provided with a female connector 19b and the body 15c with a male connector 18b. The auxiliary light source device 12c is sometimes stored separately from the body 15c according to the invention. Thus, if it has a female connector, the possibility of the source being damaged by the environment will be decreased.

Figure 8:
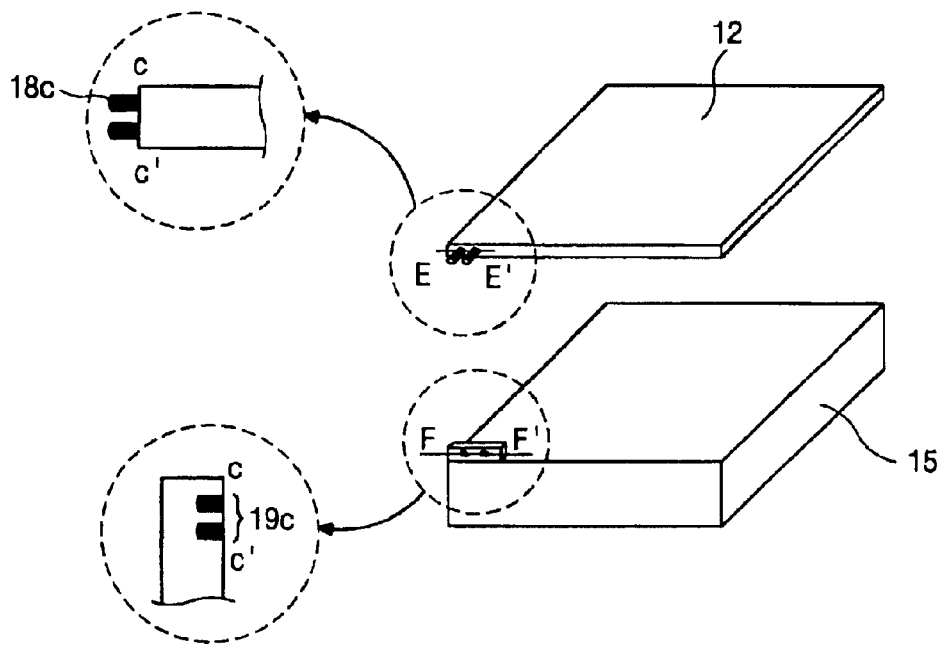
FIG. 8 is an exploded perspective view illustrating a third arrangement whereby the auxiliary light source device is electrically connected with the body of the first and second embodiments.

In the first and second embodiments, which are of drawer-type as illustrated in FIG. 8, one lateral side of the auxiliary light source device 12 is provided with a male connector 18c and the body 15 is provided with a female connector 19c in an appropriate position corresponding to the male connector 18c. Thereby, electricity is supplied from the body 15 to the auxiliary source 12 when the male and female connectors are combined with each other, e.g., at the end of the sliding process.

Figure 9:
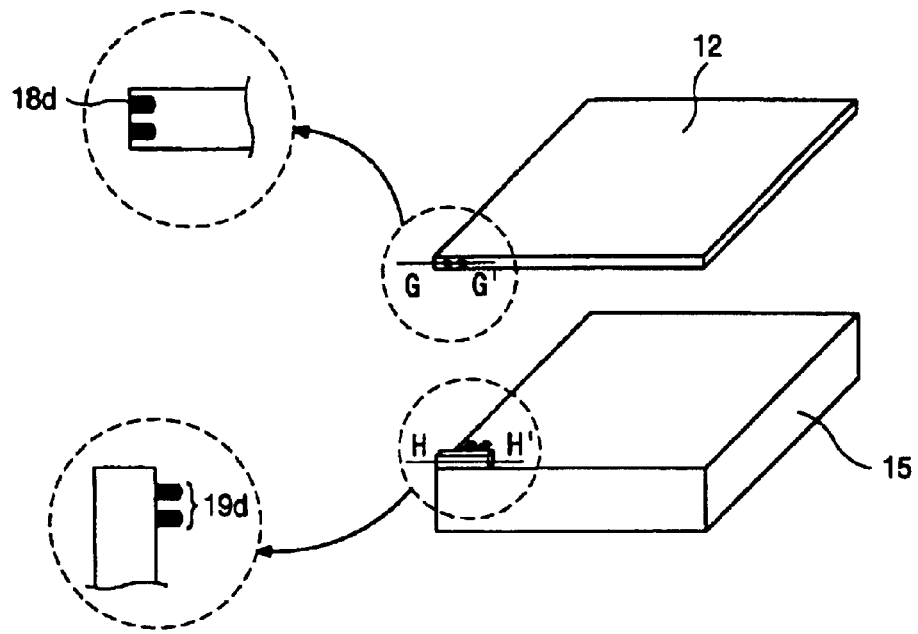
FIG. 9 is an exploded perspective view illustrating a fourth arrangement whereby the auxiliary light source device is electrically connected according to the first and second embodiments.

The male and female connectors may be reversed. That is, as shown in FIG. 9, the auxiliary light source device 12 is provided with a female connector 18d and the body 15 is provided with a male connector 19d. Again, such an arrangement tends to protect the connector 18d of the auxiliary source 12 during storage. Alternately, each of the above-described connectors may include, e.g., one male and one female lead to correspond with respective female and male leads on the facing connector.

When an auxiliary light source device is connected to a body according to the first through third embodiments, at the same time electricity begins to flow from the body to the auxiliary source device. In order that electricity may be supplied from the body to the auxiliary source device, a power supply of the body, pair of connectors and electric line relating to the auxiliary light source device are necessary besides the above described connectors. The power supply, connectors, and line are conventionally used and will not be described herein in detail.

Although the positions where the male and female connectors are formed are illustrated in FIGS. 6 to 9, a manufacturer may vary them according to a particular design. For example, the two electrical parts need not be male and female, but may be contact-type (e.g., an exposed conductive piece) and located on two surfaces which touch when the auxiliary source is connected to the body. Therefore, as long as it allows stable electricity flow from the body to auxiliary source, any modification in the position or shape of the electrical connectors is encompassed by this invention.

The following advantages, among others, are obtained by the preferred embodiments according to the invention that embody the detachable auxiliary light source for use in a reflective LCD device. Because the auxiliary source device can be removed from the body when the ambient light is used, the disadvantageous surface reflection and lowering of reflective brightness occurring when the auxiliary source device is not used in the body are prevented. The additional weight of the auxiliary source device can be avoided if the source is not needed.

Consequently, a variety of options are provided to the user of the reflective liquid crystal display device.

Although preferred embodiments and advantages thereof have been described heretofore, variations and changes are possible by the skilled in the art without departing from the spirit and scope of the invention, which will be indicated by the following claims.

What is claimed is:

1. A reflective liquid crystal display device, comprising:
   a reflective liquid crystal display;
   a body case to protect the display;
   an auxiliary light source device for supplying light to the display, the auxiliary light source device including a light guiding member being of a size that can substantially cover the display;
   engaging structure to removably engage the auxiliary light source device with the body case; and
   electric connection structure to electrically connect the body case and the auxiliary light source device,
   wherein the body case and the auxiliary light source device have similar sizes.

2. The reflective liquid crystal display device of claim 1, wherein the engaging structure includes
   a sliding rail formed on the body case for the auxiliary light source device to slide onto the body.

3. The reflective liquid crystal display device of claim 2, wherein the engaging structure includes
   concavities in the sliding rail of the body case, and
   convexities corresponding to the concavities on lateral sides of the auxiliary light source device.

4. The reflective liquid crystal display device of claim 1, wherein the engaging structure includes
   an upper surface of the body case including holes formed therein, and
   rod-type projections formed in locations on a lower surface of the auxiliary light source device corresponding to the holes.

5. The reflective liquid crystal display device of claim 1, wherein the engaging structure includes
   an upper surface of the body with screw holes formed therein, and
   corresponding through holes formed in the auxiliary source.

6. The reflective liquid crystal display device of claim 1, wherein the engaging structure includes
   an upper surface of the body with screw holes formed therein, and
   corresponding through holes formed in the auxiliary light source device.

7. The reflective liquid crystal display device of claim 1, wherein the electric connection structure includes
   a first electrical connector on the auxiliary light source device, and
   a second electrical connector on the body case corresponding to the first connector.

8. The reflective liquid crystal display device of claim 7, wherein the first electrical connector of the auxiliary light source device is formed on a lower surface thereof and the second electrical connector of the body case is formed on an upper surface thereof.

9. A reflective liquid crystal display device of claim 7, wherein the first electrical connector of the auxiliary light source device is formed on a side thereof, and the second electrical connector of the body case is formed on an upper surface thereof.

10. A liquid crystal display device, comprising:
    a body case containing a liquid crystal display; and
    an auxiliary light source device for supplying light to the display, the auxiliary light source device being attachable to and removable from the body case by a user of the device, wherein all sides of the auxiliary light source device are alignable with sides of the body case, wherein the body case and the auxiliary light source device have similar sizes.

11. The liquid crystal display device of claim 10, wherein when the body case and the auxiliary light source device are attached, the auxiliary light source device is electrically connected to the body case by respective conductors on each.

12. The liquid crystal display device of claim 10, wherein the body case includes two slots for translatably receiving the auxiliary light source device.

13. The liquid crystal display device of claim 12, wherein the slots include a plurality of gaps so that the auxiliary light source device may be inserted from above prior to translation.

14. The liquid crystal display device of claim 10, wherein the body case includes holes to receive projections from the auxiliary light source device or screws to secure the auxiliary light source device.

15. The liquid crystal display device of claim 10, wherein the auxiliary light source device includes a plurality of projections shaped to fit into corresponding holes in the body case.

16. A reflective liquid crystal display device, comprising:
    a reflective liquid crystal display; and
    a body case to accommodate the display, including
        engaging structure to removably engage an auxiliary light source device with the body case, the engaging structure disposed along outer edge portions of at least two sides of the body case, and
        electric connection structure to electrically connect the body case and the auxiliary light source device.

17. The reflective liquid crystal display device of claim 16, wherein the engaging structure includes two slots for translatable receiving the auxiliary light source device.

18. The reflective liquid crystal display device of claim 17, wherein the slots include a plurality of gaps so that the auxiliary light source device may be inserted from above prior to translation.

19. The reflective liquid crystal display device of claim 16, wherein the engaging structure includes holes to receive projections from the auxiliary light source device or screws to secure the auxiliary light source device.

20. The reflective liquid crystal display device of claim 15, wherein the electric connection structure includes an exposed conductor.

21. A removable auxiliary light source for use with a reflective liquid crystal display device, comprising:

an auxiliary light source for supplying light to the display device, including
    engaging structure to removably engage the auxiliary light source with a body of the display device, and
    electric connection structure to electrically connect the body and the auxiliary light source.

22. A removable auxiliary light source for use with a reflective liquid crystal display device, comprising:
    an auxiliary light source device for supplying light to the display device, including
        engaging structure to removably engage the auxiliary light source device with a body of the display device, the engaging structure disposed along outer edge portions of at least two sides of the auxiliary light source device, and
    electric connection structure to electrically connect the body and the auxiliary light source device,
    wherein the auxiliary light source device includes
        an auxiliary light generator, and
        a light guide plate adjacent to the auxiliary light generator to propagate auxiliary light from the auxiliary light generator through the light guide plate, the light guide plate having a size that substantially covers the display device.

23. The removable auxiliary light source of claim 22, wherein the auxiliary light source device includes a plurality of projections shaped to fit into the body.

24. The removable auxiliary light source of claim 22, wherein the projections are shaped to fit into holes in the body.

25. The removable auxiliary light source of claim 21, wherein the engaging structure includes holes to receive screws to secure the auxiliary light source to the body.

26. The removable auxiliary light source of claim 22, wherein the engaging structure includes holes to receive screws to secure the auxiliary light source device to the body.

27. The removable auxiliary light source of claim 21, wherein the electric connection structure includes an exposed conductor.

28. The removable light source of claim 22, wherein the electric connection structure includes an exposed conductor.

29. The reflective liquid crystal display device of claim 1, wherein the engaging structure is disposed along outer edge portions of at least two sides of the body case and the auxiliary light source device.

* * * * *